United States Patent
Jenkins et al.

[11] Patent Number: 6,157,925
[45] Date of Patent: *Dec. 5, 2000

[54] SYSTEM AND METHOD FOR CACHING IDENTIFICATION AND LOCATION INFORMATION IN A COMPUTER NETWORK

[75] Inventors: Christopher Jenkins, Springville; Randal Childers, Lindon, both of Utah

[73] Assignee: Novell, Inc., Provo, Utah

[*] Notice: This patent is subject to a terminal disclaimer.

[21] Appl. No.: 09/379,947

[22] Filed: Aug. 24, 1999

Related U.S. Application Data

[63] Continuation of application No. 08/942,165, Oct. 1, 1997.

[51] Int. Cl.[7] .................................................. G06F 17/30
[52] U.S. Cl. ........................................................ 707/10
[58] Field of Search ........................... 707/2, 8, 10, 201, 707/203, 103, 202; 711/128, 3, 124, 118, 133, 120, 144; 364/490; 395/200.31

[56] References Cited

U.S. PATENT DOCUMENTS

| | | | |
|---|---|---|---|
| 4,714,996 | 12/1987 | Gladney et al. | 707/203 |
| 5,157,663 | 10/1992 | Major et al. | |
| 5,392,414 | 2/1995 | Yung | 711/128 |
| 5,555,379 | 9/1996 | Silla | 711/3 |
| 5,572,528 | 11/1996 | Shuen | |
| 5,586,310 | 12/1996 | Sharman | 707/10 |
| 5,592,392 | 1/1997 | Matheson et al. | 364/490 |
| 5,594,863 | 1/1997 | Stiles | |
| 5,596,574 | 1/1997 | Perlman et al. | |
| 5,608,903 | 3/1997 | Prasad et al. | |
| 5,628,005 | 5/1997 | Hurvig | 707/8 |
| 5,652,854 | 7/1997 | Wong | |
| 5,664,176 | 9/1997 | Madduri | 707/8 |
| 5,689,706 | 11/1997 | Rao et al. | |
| 5,734,898 | 3/1998 | He | 707/203 |
| 5,737,738 | 4/1998 | Sharman | 707/201 |
| 5,784,560 | 7/1998 | Kingdon et al. | 395/200.31 |
| 5,787,470 | 7/1998 | DeSimone et al. | 711/124 |
| 5,809,522 | 9/1998 | Novak et al. | 711/118 |
| 5,822,749 | 10/1998 | Agarwal | 707/2 |
| 5,909,695 | 6/1999 | Wong et al. | 711/138 |
| 5,918,013 | 6/1999 | Mighdoll et al. | 395/200.47 |
| 5,933,849 | 8/1999 | Srbljic et al. | 711/118 |

OTHER PUBLICATIONS

"Cache designs with partial address matching (abstract)", L. Liu, Micro 27, Proceedings of the 27th annual international symposium on Microarchitecture, No later than Oct. 29, 1997, p. 1.

"Computer Networks, Third Edition", A. S. Tanenbaum, *Prentice Hall PTR*, 1996, Title & pp. 488–510.

"Distributed Operating Systems", A. S. Tanenbaum, *Prentice Hall*, 1995, Title & pp. 256–288.

"An Introduction to Database Systems, Sixth Edition", C. J. Date, *Addison Wesley Publishing Company*, 1995, Title & pp. 605–614, 669–690.

(List continued on next page.)

*Primary Examiner*—Wayne Amsbury
*Assistant Examiner*—Thuy Pardo
*Attorney, Agent, or Firm*—Computer Law + +

[57] ABSTRACT

Methods and systems are provided for caching information in a distributed computer system such as a directory service system. Tuples in a client cache contain component identifiers and corresponding location identifiers. Tuples may contain a list of network addresses specifying at least one server containing additional location or object information, as well as replica flags which distinguish between read-only replicas, read-write replicas, and a master replica. Requests to access an object may be serviced by using cached information rather than making one or more attempts to obtain location information from servers. Tuples may be modified or invalidated such that read operations tend to be performed using read-only replicas. Cached tuples which contain a component identifier that is no longer valid because an object was moved or renamed may be invalidated. The cache may also be modified to redirect operations from a master replica to a non-master replica.

40 Claims, 5 Drawing Sheets

OTHER PUBLICATIONS

Novell Consulting Services—NDS Implementation Tips, Unknown, http://straylight.cso.niu.edu/nats/nw4tips.htm, no later than Sep. 4, 1997, pp. 1–25.

"Reasoning about naming systems(abstract)", M. Bowman et al., *ACM Transactions on Programming Languages and Systems*, vol. 15, No. 5, Nov. 1993, p. 1.

"Reference to remote mobile objects in THOR (abstract)", M. Day et al., *ACM Letters on Programming Languages and Systems*, vol. 2, No. 1–4, Mar.–Dec. 1993, p. 1.

"Set–associative cache simulation using generalized binomial trees (abstract)", R. A. Sugurmar et al., *ACM Transactions On Computer Systems*, vol. 13, No. 1, Feb. 1995, pp. 1–2.

SYSTEM AND METHOD FOR CACHING IDENTIFICATION AND LOCATION INFORMATION IN A COMPUTER NETWORK

RELATED APPLICATIONS

This application is a continuation of application Ser. No. 08/942,165 filed Oct. 1, 1997.

FIELD OF THE INVENTION

The present invention relates to caching in a distributed or networked computer system, and more particularly to a system and method for caching identification and location information such as database object names and server addresses in a network which supports X.500 or other directory service operations.

TECHNICAL BACKGROUND OF THE INVENTION

In computer networks and other distributed computing systems, a copy of data that originally resides on one computer is often requested by processes or users at other computers. The requested data may be part of a file, selected database records, executable code, or other data or components. In order to reduce network traffic, improve response time, and otherwise increase efficiency, various caching systems have been devised. In general, caching promotes efficiency by placing data in memory at a location which is more readily accessed by the requesting process than the data's original location. Caching and networks are discussed in numerous references, including U.S. Pat. No. 5,594,863 issued to Stiles for a Method and Apparatus for Network File Recovery, incorporated herein by reference.

A variety of "directory service" providers are now available to help administer both the location of network resources and the rights of network users to use those resources. Many, but not all, directory service tools conform at least in part with the X.500 directory services standard. Directory services are sometimes referred to as "naming services." One well-known directory services system includes NetWare Directory Services software commercially available from Novell, Inc. of Provo, Utah (NETWARE DIRECTORY SERVICES is a trademark of Novell, Inc.). As used herein, "Novell Directory Services" ("NDS") includes NetWare Directory Services and any other directory service commercially available from Novell, Inc. Directory services and NDS are discussed in numerous references, including U.S. patent application Ser. No. 08/499,711 in the name of Sonderegger et al., now U.S. Pat. No. 5,692,129, incorporated herein by reference.

Known network caching methods are less useful with directory service data than with other forms of network data because directory service data contains more references. References may be in the form of server addresses, database object identifiers, or other structures containing indexes, pointers, addresses, or other references further identifying the location of desired resources or data.

FIG. 1 illustrates the importance of references in a known directory services system. The system includes clients and servers connected in a network, as well as a directory service database or repository which resides in one or more replicas on one or more of the servers. On some platforms, a "client" computer running client software is in fact the same computer as a "server" computer; that is, the same computer acts as both server and client. Different systems may utilize references in ways other than those illustrated, but the use of references is not unusual whenever objects identified by users through logical names must be matched with one or more physical copies of the objects which are stored at physical locations hidden from (transparent to) the application and the user.

One common sequence of directory service events begins when an application request 100 is sent to a client 102. The request 100 may be any of a wide variety of requests that cause access to the database, including without limitation a request to read or write the attributes of an object in a database, in a registry, or in another repository. The request 100 may be generated, directly or indirectly, by Novell GroupWise software, by Novell Client32 software, or by other networked or groupware programs running on multiple platforms such as DOS, Windows 3.1, Windows 95, Windows NT, OS/2, NetWare (trademarks of their respective owners), and other platforms. A networked database system is only one of many possible examples. If the client and server are the same computer acting in different roles, then it is possible that the request 100 and other communications are sent by message routing through several software layers on the computer, making it indistinguishable at some point from communications which traveled from a remote client over a network connection.

The request 100 identifies the object in question by a distinguished name 104, or by part of the distinguished name 104 plus contextual information that allows the client 102 to construct the full distinguished name 104. The distinguished name 104 may be an NDS distinguished name or another database-wide or system-wide component identifier. The client 102 sends the distinguished name 104 to a server 106 (called "server A" for purposes of discussion) in order to find out where a copy of the object identified by the distinguished name 104 physically resides in the network. In many cases, the details of the request 100 greatly increase the size of the packet(s) being sent, so the client 102 tries to find a server that can use the details to service the request 100 before using, the bandwidth needed to send the details.

Server A either has a copy of the object that can be used to respond to the request 100, or it does not. If server A has a copy, it sends an internal identifier 108 back to the client 102. The internal identifier 108, which corresponds to an instance of the object identified by the distinguished name 104, may include an entry identifier of the kind used in NDS or another replica-wide component identifier. The internal identifier 108 may include an inventive "tuned name" of the kind discussed in application Ser. No. 08/764,236 filed Dec. 14, 1996 and incorporated here by reference, or the identifier 108 may include another kind of internal object identifier.

Even if server A does not have a copy of the object, it may still have useful information about the location of the desired copy. In the illustrated sequence, server A sends the client 102 a list 110 of other servers that might have a copy of the object. For purposes of discussion, the list 110 shown in FIG. 1 is assumed to contain addresses identifying three other servers 106, denoted "B," "C," and "D," respectively. As shown, the client 102 then sends the distinguished name 104 to the identified servers in turn (this could also be done in parallel), until one of the servers indicates the availability of a copy of the desired object by returning the object's internal identifier 108. If a requested server 106 does not have a copy of the object, it may return another server list 110. Alternatively, the server 106 may return a negative acknowledgment 112 if it has no copy and if the client 102 indicates that no further server lists 110 are needed.

As illustrated in FIG. 1, it is not unusual for the client 102 to contact several servers 106 before finding one that will give the client 102 access to a copy of the desired object. Once such a server 114 is found (the server 114 being either server A or server D in the illustrated sequences), the client 102 sends the internal identifier and associated details 116 to the server 114. The server 114 processes the request and returns the results 118 to the client 102.

Unfortunately, most or all of this process is repeated if a second request 100 arrives, the main difference being that fewer—or more—servers 106 may need to be queried to service this second request 100. Most of the process is repeated, even if the distinguished name 104 in the second request 100 also appeared in the first request 100. These repeated server contacts take time, and increase the load on network connections.

Moreover, the problem is not limited to the sequences illustrated, or even to directory service databases. Other distributed databases are subject to similar inefficiencies when references are used to translate logical, high-level identifiers into lower-level physical locations of distributed and/or replicated data objects and records.

It would therefore be an advancement in the art to provide a method and system for improving the speed and efficiency with which references are used in a distributed system.

It would be an additional advancement to provide such a method and system which reduced network traffic and server queries in a directory services system.

Such a method and system are disclosed and claimed herein.

BRIEF SUMMARY OF THE INVENTION

The present invention provides a method and system for caching information in a computer system. One method of the invention includes placing at least one tuple in a cache. Each tuple contains a component identifier, such as a distinguished name. which identifies a cache-enabled component by acting as a key during searches of the cache. Each tuple further contains a location identifier, such as an entry ID, which identifies a location at which the cache-enabled component resides.

Upon receiving an access request which identifies a requested component, the method determines whether the requested component is cache-enabled, that is, whether a cached tuple key matches the component identifier of the requested component. If the requested component is not cache-enabled, the access request is serviced by sending a corresponding request (through memory or over a network link) to a server computer. If a valid cached tuple keying off the component identifier is found, however, then the request is serviced using the location identifier of that tuple.

Tuples may also contain a list of network addresses specifying at least one server at which the corresponding cache-enabled component resides, and/or replica flags. The replica flags distinguish between read-only replicas, read-write replicas, and a master replica.

One embodiment of a computer system according to the invention includes a client computer having a processor, a memory, and a means for receiving a component access request which identifies a requested component. A tuple cache resides on the client computer. Each cached tuple contains a component identifier which identifies a cache-enabled component and a corresponding location identifier which identifies the location(s) at which the cache-enabled component reside(s). The location identifier may include a list of server addresses, entry identifiers, or other pointers or addresses or internal identifiers. Tuples may also include replica flags.

Software such as a cache manager module allows the client to place a tuple in the tuple cache, and searches the cached tuples to determine whether the requested component is cache-enabled. Additional software (and/or hardware) services the access request by sending a corresponding request to a server computer if the requested component is not cache-enabled, and by using the cached location identifier if the requested component is cache-enabled. The server and the client may be the same computer, or they may be separate computers connected by a network link.

The system cache may be reinitialized in its entirety, and individual tuples may be modified or invalidated, in response to access requests or commands from the client or a lack of memory space. For instance, cached location information may be revised to encourage conformance with predetermined preferences that certain operations (such as reads) be performed using certain kinds of replicas (such as read-only replicas rather than read-write or master replicas). Cache tuples may be invalidated if they contain a component identifier that is no longer valid because an object was moved or renamed. The cache may also be modified to redirect operations from a master replica to a non-master replica.

In short, the invention addresses the problems of scarce network bandwidth and excessive retries when a server becomes unavailable in the middle of an operation. The invention reduces the number of packets on the network by caching certain directory service repository information, thereby increasing the available network bandwidth. The invention also caches certain state information in the form of tuples. The tuples can be used to reduce the number and duration of retries when servers go down by providing finer granularity to the set of checkpoints from which an interrupted operation can be resumed. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and system for improving the speed and efficiency with which references to desired components are used in a distributed system by caching certain combinations of such references. The invention is illustrated with respect to a directory service network, but those of skill in the art will appreciate that the invention may also be used to advantage in other distributed systems.

The invention may be used with local area networks, wide area networks, and/or the Internet. "Internet" as used herein includes variations such as a private Internet, a secure Internet, a value-added network, a virtual private network, an extranet, or an intranet. The computers connected by the network may be workstations, laptop computers, disconnectable mobile computers, servers, mainframes, or a combination thereof. The network may include one or more LANs, wide-area networks, Internet servers and clients, intranet servers and clients, peer-to-peer nodes, or a combination thereof.

Figure 2:
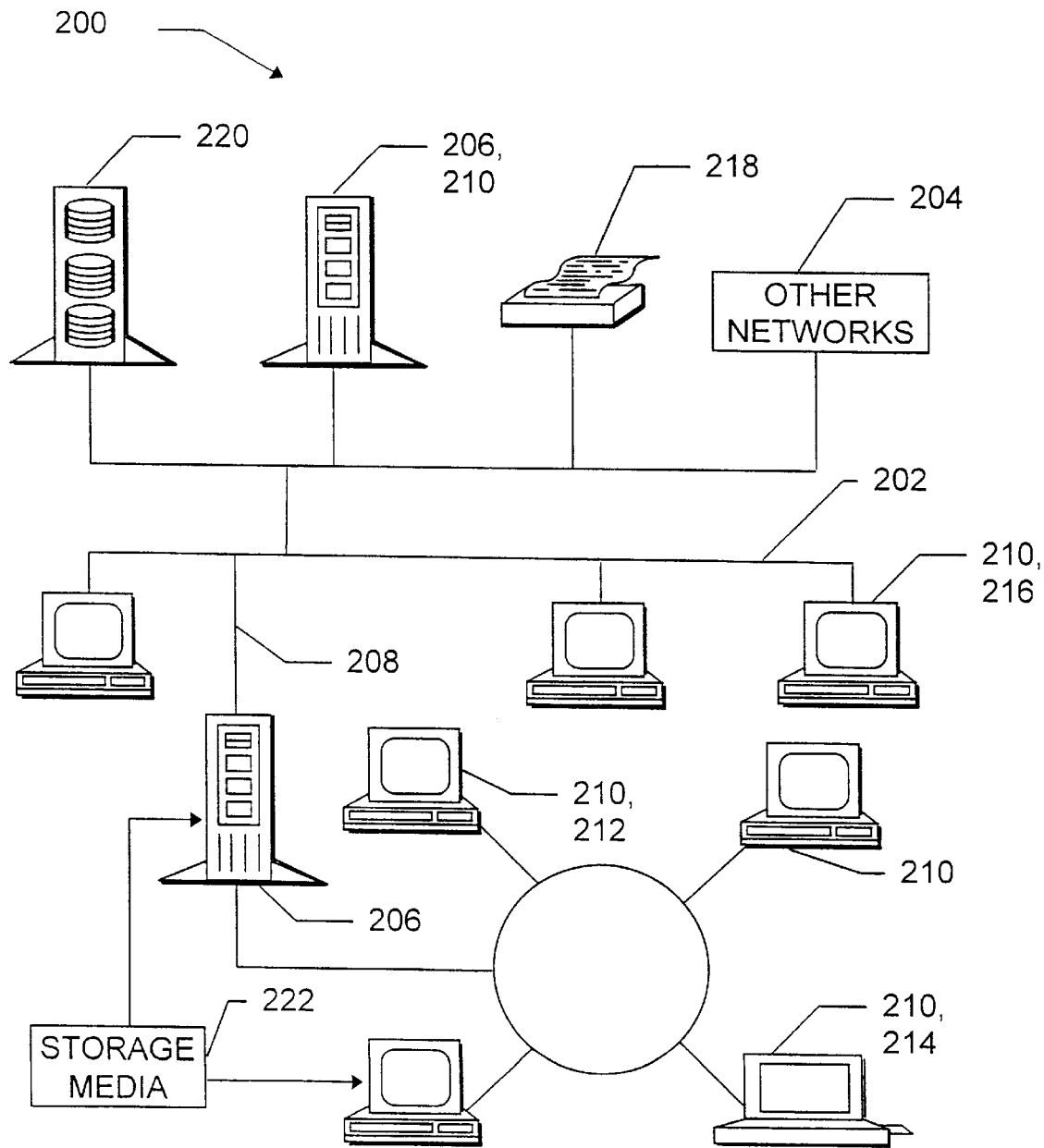
FIG. 2 is a diagram illustrating a network of computers which is among the many distributed systems suitable for use with the present invention.

One of the computer systems suited for use with the present invention is indicated generally at 200 in FIG. 2. In one embodiment, the system 200 includes Novell NetWare® network operating system software (NETWARE is a registered trademark of Novell, Inc.) and Novell Directory Services software. In alternative embodiments, the system 200 includes NetWare Connect Services, VINES, TCP/IP, Windows NT, Windows 95, LAN Manager, and/or LANtastic network operating system software and/or an implementation of a distributed hierarchical partitioned object database according to the X.500 protocol or another directory service protocol such as the Lightweight Directory Access Protocol (VINES is a trademark of Banyan Systems; NT, WINDOWS 95, and LAN MANAGER are trademarks of Microsoft Corporation; LANTASTIC is a trademark of Artisoft). The system 200 may include a local area network 202 which is connectable to other networks 204, including other LANs or portions of the Internet or an intranet, through a gateway or similar mechanism.

The system 200 includes several servers 206 that are connected by network signal lines 208 to one or more network clients 210. The servers 206 and network clients 210 may be configured by those of skill in the art in a wide variety of ways to operate according to the present invention. The servers 206 may be configured as Internet servers, as intranet servers, as directory service providers or name servers, as software component servers, or as a combination thereof. The servers 206 may be uniprocessor or multiprocessor machines. The servers 206 and clients 210 each include an addressable storage medium such as random access memory and/or a non-volatile storage medium such as a magnetic or optical disk.

Suitable network clients 210 include, without limitation, personal computers 212, laptops 214, workstations 216, and dumb terminals. The signal lines 208 may include twisted pair, coaxial, or optical fiber cables, telephone lines, satellites, microwave relays, modulated AC power lines, and other data transmission "wires" known to those of skill in the art. In addition to the network client computers 210, a printer 218 and an array of disks 220 are also attached to the system 200. A given computer may function both as a client 210 and as a server 206; this may occur, for instance, on computers running Microsoft Windows NT software. Although particular individual and network computer systems and components are shown, those of skill in the art will appreciate that the present invention also works with a variety of other networks and computers.

The servers 206 and the network clients 210 are capable of using floppy drives, tape drives, optical drives or other means to read a storage medium 222. A suitable storage medium 222 includes a magnetic, optical, or other computer-readable storage device having a specific physical substrate configuration. Suitable storage devices include floppy disks, hard disks, tape, CD-ROMs, PROMs, random access memory, and other computer system storage devices. The substrate configuration represents data and instructions which cause the computer system to operate in a specific and predefined manner as described herein. Thus, the medium 222 tangibly embodies a program, functions, and/or instructions that are executable by the servers 206 and/or network client computers 210 to perform reference information caching and utilization steps of the present invention substantially as described herein.

Figure 3:
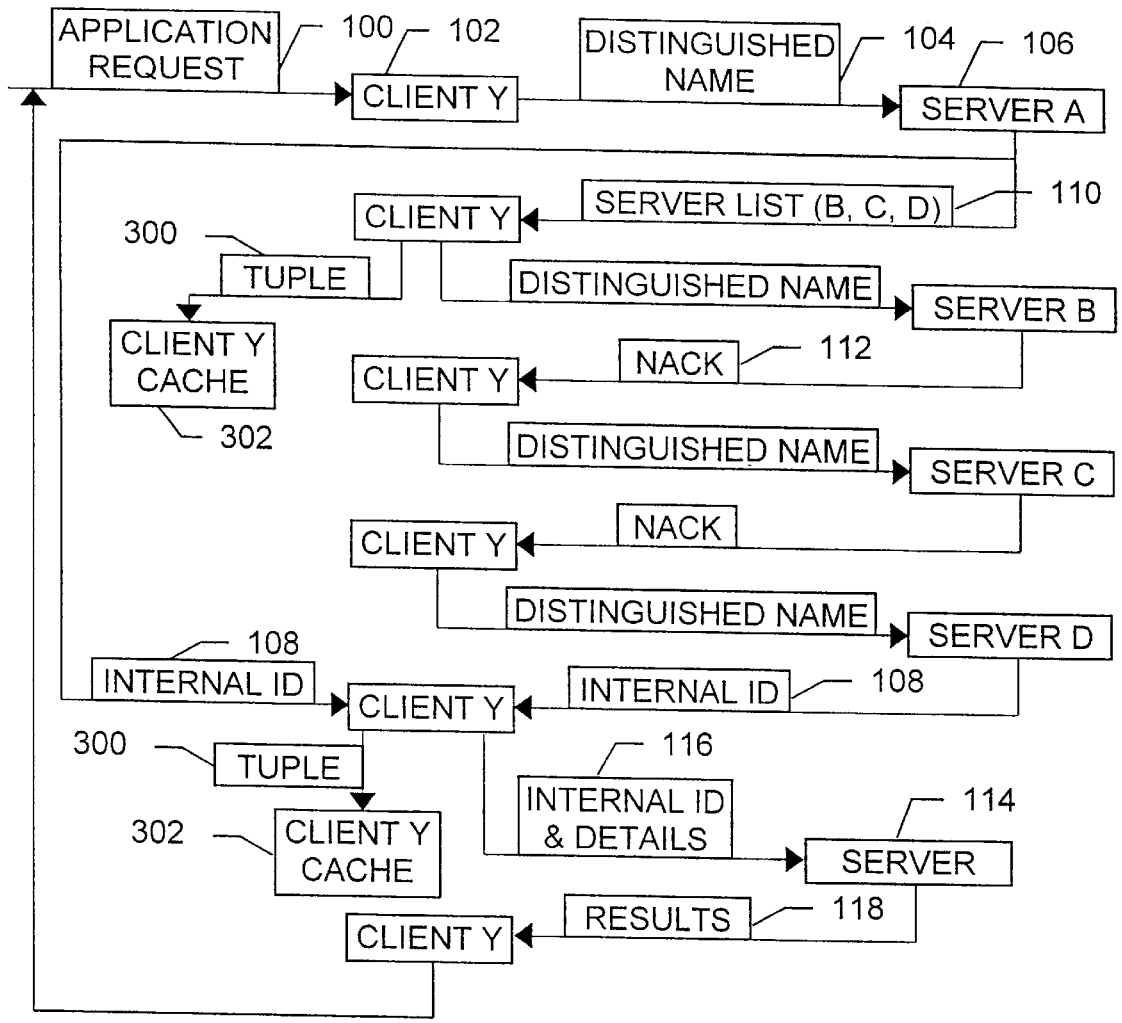
FIG. 3 is a flow diagram illustrating an initial event sequence which processes an application request that seeks access to a particular object in a distributed system according to the present invention.

FIG. 3 illustrates an initial event sequence which processes the application request 100 according to the present invention. After the internal identifier 108 is obtained, the client 102 creates a tuple 300 which is placed in a local cache 302 for ready access. As an alternative, or in addition to caching the internal identifier 108, the server list 110 may be cached. The cache 302 may include random access memory, local non-volatile buffer storage such as a hard disk, or both. The cache 302 is preferably local, so that the client 102 is not required to send packets over the network lines 208 to access the cache 302.

The contents of the tuple 300 are discussed in detail below in connection with FIGS. 5 through 8. At present it suffices to note that in one embodiment the tuple associates the distinguished name 104 of the object being sought with the internal object identifier 108 provided by the server 114 that has an available copy of the object. In one directory service caching embodiment only the part of a distinguished name above the common name is used in the cached tuple 300; if the common name is included, it is ignored so that the cache search keys on the container rather than an individual object.

After caching the tuple 300, the client 102 sends the internal identifier 108 and details of the application request 100 to the server 114 in a packet or block 116, receives the results 118, and awaits the next request 100, much as in conventional systems.

Unlike conventional systems, however, the system shown in FIG. 3 has retained the "knowledge" that the server 114 granted access to the object identified by the particular distinguished name 104 in question; this is done by creating and caching the tuple 300 which associates the server and the object. If the server list 110 is cached, the system similarly "remembers" that the listed servers are more likely than other servers to have a copy of the desired object. In either or both cases, some server queries that would be needed in conventional systems can be eliminated by using the cached tuples 300.

Figure 4:
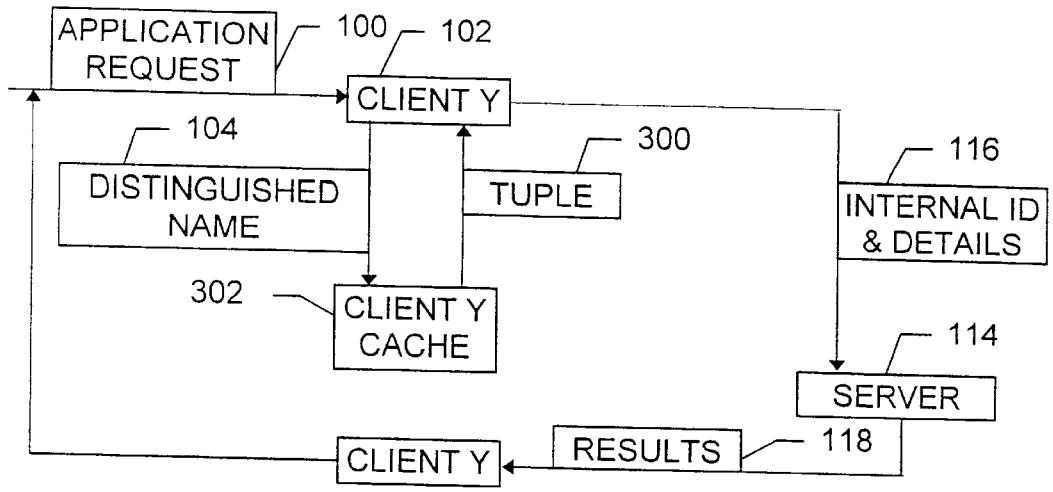
FIG. 4 is a flow diagram illustrating an event sequence occurring after the sequence in FIG. 3, in which the system uses cached information to process later application requests that seek access to the same object sought in FIG. 3.

As illustrated in FIG. 4, when the client 102 receives a subsequent request 100, the client 102 checks the cache 302. The client 102 determines whether an available copy of the object sought has already been located by searching the cache 302 for a tuple 300 involving the internal identifier 108, and determines whether an available copy has been partially located by searching the cache 302 for the server list 110. This check may be initiated by sending the distinguished name(s) 104 in the request 100 to a cache manager that is part of the cache 302.

For ease of explanation, this discussion generally assumes one distinguished name 104 per request 100, but a given request 100 may contain several names 104; the present invention also covers multiple cache 302 searches and/or other cache usage steps per request 100. A suitable cache manager is readily provided by those of skill in the art using the teachings presented here, computers such as those shown in FIG. 2, and programming languages such as Java, Pascal, C++, C, assembly, firmware, microcode, and/or other languages.

The cache manager performs a lookup. If the distinguished name 104 is not associated with any internal identifier 108 or server list 110 by the cached tuples 300, then the cache manager returns a negative acknowledgment to the client 102. The client 102 then queries servers to obtain an appropriate internal identifier 108, caches it (possibly also caching a server list prior to that), and uses the internal identifier 108 in the block 116 as shown in FIG. 3.

If the cache manager finds one or more cached tuples which associate the distinguished name(s) 104 with corresponding internal identifier(s) 108, thereby locating one or more available copies of the desired object, then the information in those tuples is provided to the client 102. The client 102 skips the server queries that should have been needed to obtain the cached location information, and proceeds instead by sending the internal identifier 108 and application request details 100 to the server 114. The client 102 then receives the results 118 and awaits the next request 100. If no internal identifier 108 is cached but a server list 110 is cached, then the client 102 skips the step of obtaining the server list 110 and proceeds otherwise as shown in FIG. 3.

Figure 1:
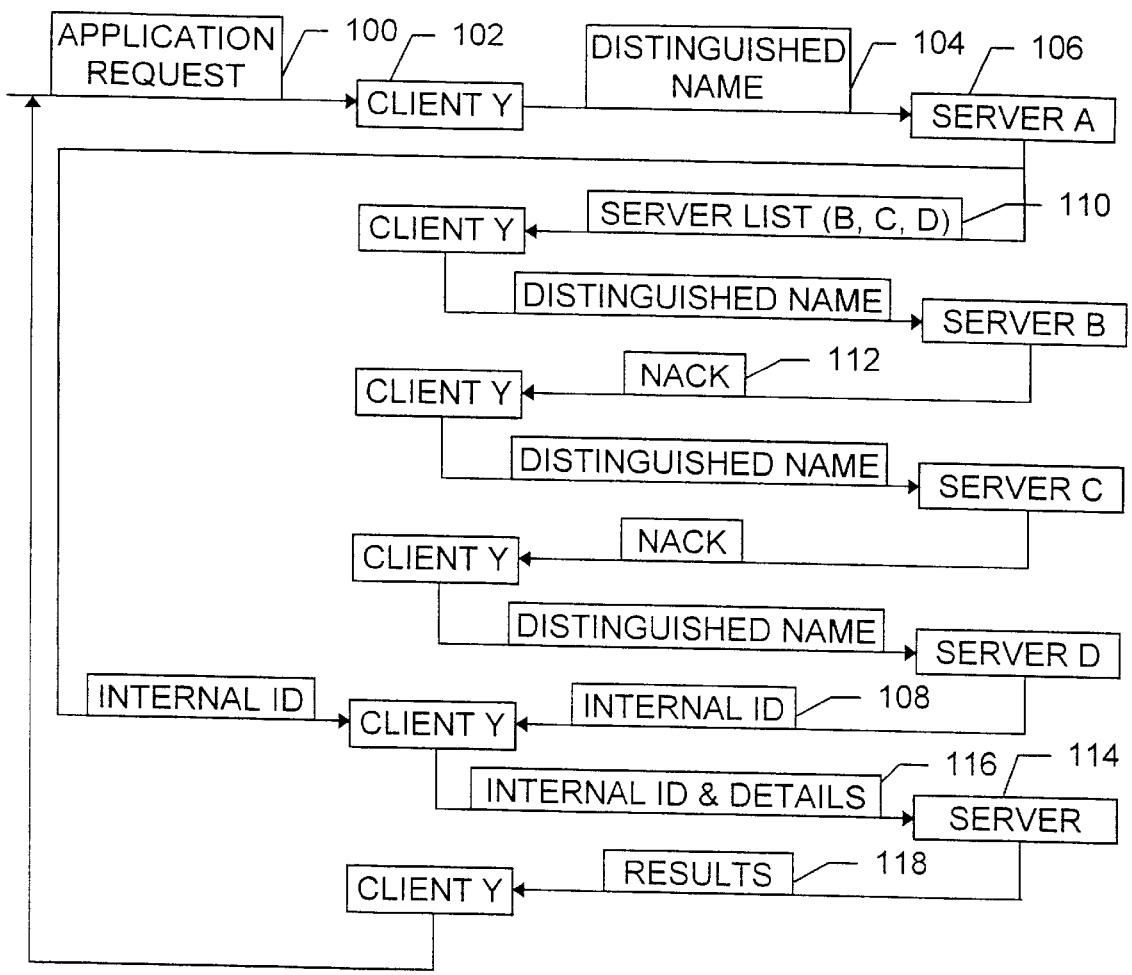
FIG. 1 is a flow diagram illustrating conventional event sequences which process application requests in a conventional distributed system.

Of course, there is no guarantee that the server 114 identified through a cached tuple 300 by using a list 110 or an internal identifier 108 will still grant access to a copy of the object. Conditions may have changed since the list 110 or the identifier 108 was supplied to the client 102. For instance, access rights may have changed, the connection with the server 114 may have been lost, the server 114 may be stalled or rebooting or low on memory or undergoing maintenance, or the copy may have been moved or deleted. Nonetheless, using the cached information will tend to improve performance by reducing or eliminating the time and bandwidth spent searching for object copies under the conventional approach shown in FIG. 1.

Figure 5:
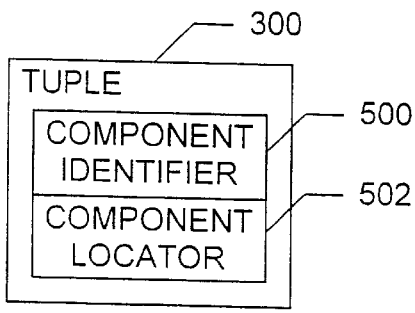
FIG. 5 is a block diagram illustrating the general structure of a tuple stored in the cache that is shown in FIGS. 3 and 4.

FIG. 5 illustrates the general structure of the cache tuple 300. A component identifier 500 identifies the object, record, or other component that would be accessed to service the application request 100. The identifier 500 is generally a logical identifier rather than a physical one. That is, the identifier 500 is designed to help users and applications distinguish between different objects rather than distinguishing between physical copies of a given object. A component locator 502 identifies to the lower-level internal software the location of a copy of the component identified by the component identifier 500. The tuple 300 may also include additional information, including without limitation an expiration time, a relative priority. the operation to be performed (read, write, login, and so forth), or a checksum.

The component locator 502 may include the internal identifier 108, or the locator 502 may be an index, pointer, or other means of accessing such an identifier 108. As an alternative, or in addition, the component locator 502 may include the list 110 of server addresses obtained by the client 102. If both kinds of information are included, then the method is illustrated in FIG. 9 can be used to greater advantage.

Figure 9:
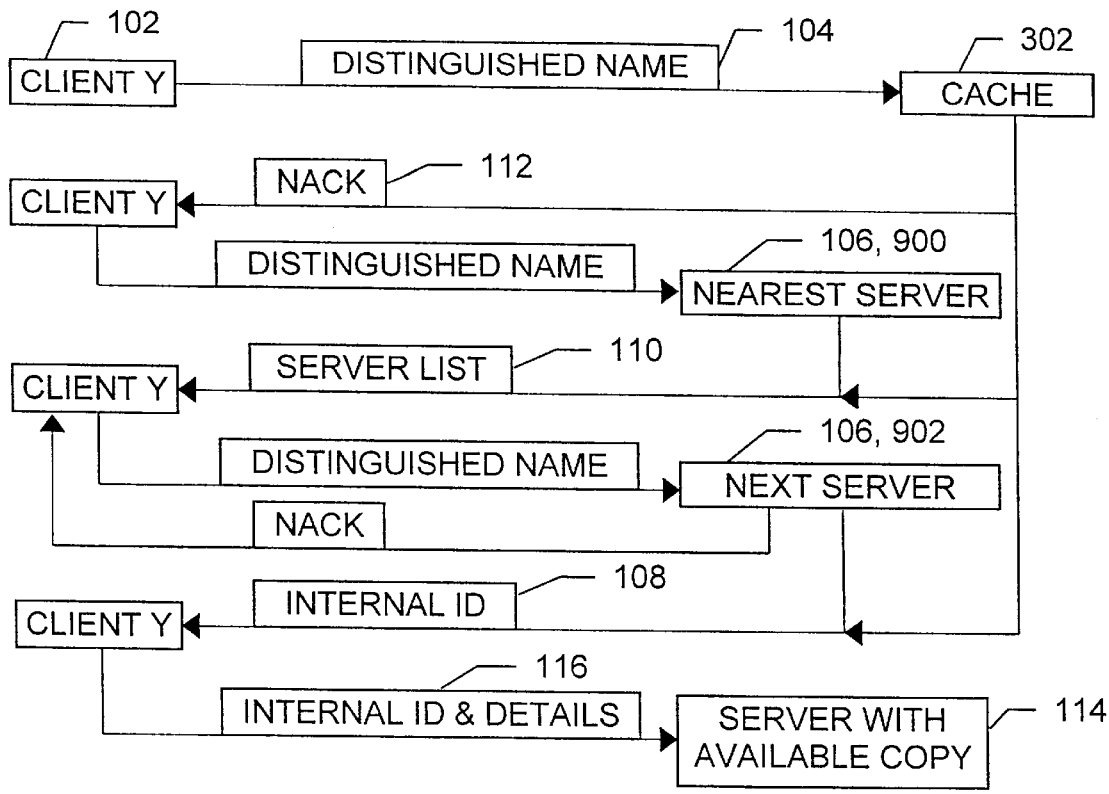
FIG. 9 is a flow diagram illustrating event sequences which include locating different kinds of location identifiers in the cache according to the invention.

As shown in FIG. 9, the client 102 can try to access the desired object on the specified server 114 using the internal identifier 108. The client 102 may also try to access a different copy of the object on another server using the list 110 or another internal identifier 108 if the attempt using the first identifier 108 fails. As a last resort, the client 102 may repeat the full set of server queries (starting with the query to server A in FIG. 3) if none of the servers in the list 110 can provide access to a copy of the object.

FIG. 9 also illustrates how some server queries may be avoided, depending on the results of the cache manager's search. The client 102 sends the distinguished name 104 to the cache manager, which searches currently valid cache tuples 300 in the cache 302. If no tuple 300 involving the distinguished name 104 is found, the cache manger sends the client 102 a negative acknowledgment 112 or other failure indication. The client 102 then sends the distinguished name 104 to a server 106, such as a nearby server 900, to obtain a server list 110. However, the client 102 may also be able to obtain the server list 110 from the cache 302 in some cases.

The client 102 uses the server list 110 to query one or more servers 902 until the client 102 obtains an internal identifier 108. The client 102 may also be able to obtain the internal identifier 108 from the cache 302 in some cases. The client 102 uses the internal identifier 108 to build the block 116 which is sent to the server 114 having the copy of the object identified by the identifier 108.

Returning now to the discussion of FIG. 5, those of skill will understand that systems 200 which use replication may embody the desired component in one or more copies placed at different locations in the system 200 to promote efficient access and fault-tolerance. For discussion purposes, we assume the system 200 contains at most one replica per server, but embodiments of the invention are readily made for use on systems that allow multiple replicas per server. If the system 200 provides directory services through NDS, the Lightweight Directory Access Protocol, or X.500 compliant services, then the component identifier 500 may include a name identifying the object in a hierarchy, such as the distinguished name 104 previously discussed.

Figure 6:
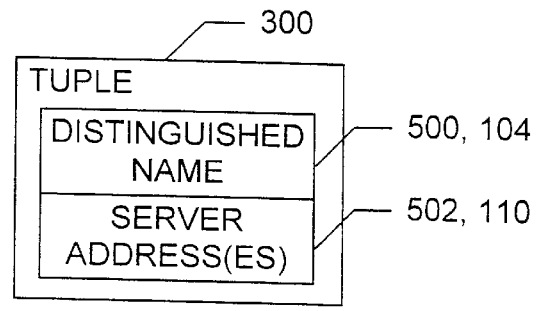
FIG. 6 is a block diagram illustrating a first alternative embodiment of the tuple shown in FIG. 5.

FIG. 6 illustrates an embodiment of the tuple 300 which includes the distinguished name 104 and the list of server addresses 110 as elements. The server addresses may include, without limitation, a network address, a port number, a socket number, or some combination of these elements.

Figure 7:
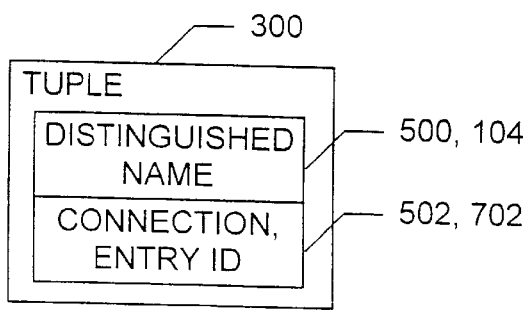
FIG. 7 is a block diagram illustrating a second alternative embodiment of the tuple shown in FIG. 5.

FIG. 7 illustrates an embodiment of the tuple 300 which includes the distinguished name 104 and a pair 702 containing a connection identifier and an entry identifier. The connection identifier identifies a specific connection with a given server 114. The connection identifier serves implicitly as a server address, but is more specific because a given server 114 and client 102 may communicate concurrently or sequentially through one or more connections. The entry identifier may include a replica number or the replica to be used may be identified elsewhere (perhaps by a server address or a connection identifier). In either case, the entry identifier locates a copy of the object identified by the distinguished name 104.

Figure 8:
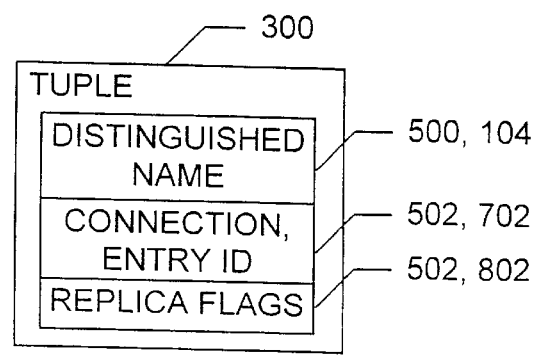
FIG. 8 is a block diagram illustrating a third alternative embodiment of the tuple shown in FIG. 5.

FIG. 8 illustrates an embodiment of the tuple 300 which is similar to the embodiment shown in FIG. 7, but also includes a set of one or more replica flags 802. Various replica flags 802 may be used. One approach according to the invention uses a single flag to indicate whether a replica referred to by the field 702 is a "master" replica. Another inventive approach uses the flags 802 to distinguish between a master replica, to one or more "read-write" replicas, and one or more "read-only" replicas. Flags may be implemented as one or more bits in a set, as one or more multi-valued integer variables, or by other programming techniques.

A read-write replica is one which can be both read and written by the client 102, while a read-only replica is one whose contents can only be read (not written) by the client 102. The master replica for the system 200 or for a defined subsystem thereof is the replica whose contents tend to determine the values stored in a distributed replicated database maintained on the system. Differences between a copy of a given object in the master replica and a copy of that object in other replicas are generally resolved by making all copies match the copy in the master replica.

Figure 10:
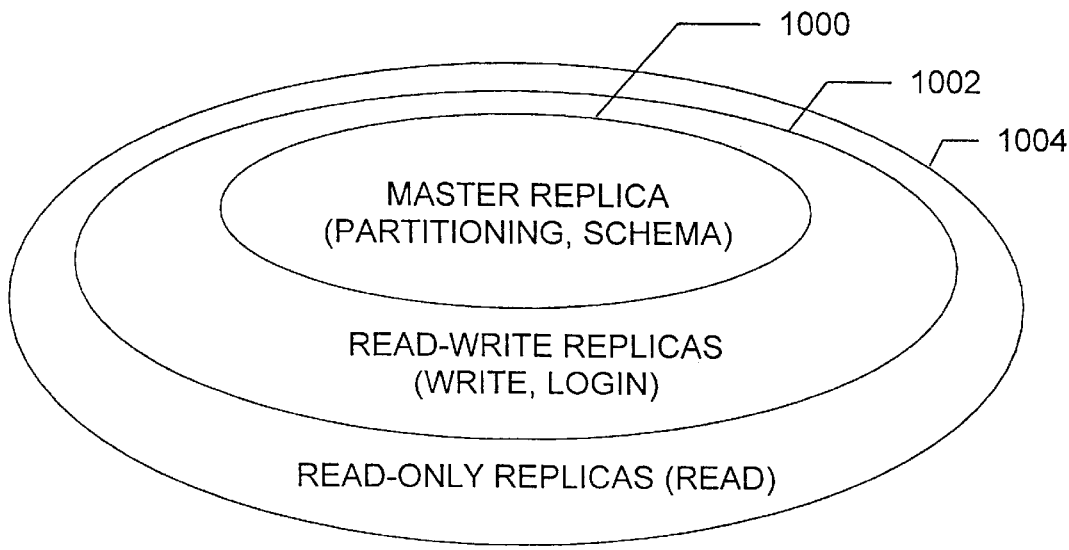
FIG. 10 is a diagram illustrating different kinds of replicas and examples of operations which are preferably performed on each kind of replica.

A relationship between the three kinds of replicas and operations taking place in the system 200 is summarized in FIG. 10. For purposes of discussion, the system 200 is assumed to contain one master replica 1000, several read-write replicas 1002, and several read-only replicas 1004, but systems according to the invention may contain zero or more read-write replicas and zero or more read-only replicas, and may be aggregated from subsystems which each contain their own master replica.

As shown, it is preferred that the master replica 1000 be reserved for use in partitioning, schema access, and other operations that are best done on a central, authoritative server 106 in the system 200. (Schemas are discussed in patent application Ser. No. 08/499,711 filed Jul. 7, 1995 and incorporated herein by reference). However, the master replica can also be used for more routine operations, such as logging in to the system 200, writing values into objects or records in the replicated database or repository, and reading object values. Likewise, the read-write replicas 1002 are preferably used for routine write operations not involved with database administration, and for logging in, but can also be used for routine read operations. The read-only replicas 1004 cannot be used for partitioning, schema control, any sort of write operation, or login operations, but only for reading object values.

Accordingly, in one embodiment of the system 200, the client 102 and/or cache manager use the replica flags 802 to encourage conformance with the preferences shown in FIG. 10. For instance, the client 102 may decline to use a component locator 502, even though the component locator includes an internal identifier 108, if the internal identifier 108 refers to a copy in the master replica 1000 and the operation being performed to service the application request is not a master replica operation such as partitioning. This may increase the number of cache 302 queries and/or server 106 queries, but it will also redirect non-master operations like writes and reads to replicas other than the master replica 1000, thereby easing the load on the master replica 1000.

The cache manager may also be instructed by the client 102 to treat cache entries as invalid when the requested operation lies outside the scope of the corresponding replica type. Thus, a cache tuple whose component locator identifies the master replica 1000 would be treated as invalid for non-master operations such as regular reads and writes but valid for reading the partition definition or updating the schema. In the alternative, a new cache tuple could be created and the tuples 300 could be prioritized. Similar measures may be taken with read-write replicas 1002 and read operations.

The replica flags 802 may also be used to avoid failures that would result when a block 116 is sent to the wrong type of replica. For instance, suppose a read operation causes creation of a cache tuple 300 whose component locator 502 identifies a server whose replica is read-only. If the next operation requires writing to a replica and the client 102 tries to use the internal identifier 108 that was cached by the read, then the write will fail. The system 200 therefore preferably tracks operation and replica types as well as component locations, to prevent replica access operations that will inevitably fail. The cache 302 may also be revised, so that the tuple 300 created as a result of the initial read operation is either replaced or supplemented by a new tuple that contains a component locator 502 identifying a read-write replica 1002.

In addition to the features discussed above, some embodiments of the system 200 are configured with a means whereby the client 102 can "flush" (empty) the cache 302 of valid tuples 300 to reinitialize the cache 302. Those of skill will appreciate that this can be implemented by freeing the memory used to hold tuples, by marking a flag or index or pointer in a tuple structure or record as unused or free or null, or by similar techniques.

The cache 302 and/or the client 102 preferably detect requests 100 that will modify the distinguished name 104, such as requests to move an object to a different location in a directory hierarchy, requests to rename an object by changing its common name, and requests to delete an object. After such requests are serviced, the initial distinguished name 104 is no longer valid. Accordingly, cached tuples 300 which contain the initial distinguished name 104 should be invalidated. In the alternative, such tuples 300 may be modified in place by inserting the new value of the distinguished name 104.

The cache 302 may be implemented using a fixed amount of memory and criteria such as "least recently used" may be used to determine which cached tuple 300 is deleted or otherwise invalidated to make room for a new tuple 300. In this case, it is preferable that the original tuple 300 be deleted only after the usefulness of the new tuple 300 has been confirmed. The usefulness of a server list 110 tuple 300 could be confirmed by receiving an internal identifier 108 from a server on the list 110; the usefulness of an internal identifier 108 tuple could be confirmed by receiving results 118 based on the identifier 108.

In summary, the present invention provides a novel system and method for caching server lists, internal identifiers, and other reference information in a distributed system. The caching systems and methods described will tend to reduce network traffic and server queries in a directory service system by first caching and then later referring to location information instead of gathering that information anew for each request. The invention reflects the importance of certain subtleties and complexities in directory service systems, including the relationship between server lists and internal identifiers, the relationship between replica types and operations that can be performed, and the effect of certain object operations on the validity of cached information.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for caching information in a computer network, comprising the computer-implemented steps of:

placing at least one tuple in a cache, each tuple containing a component identifier which identifies a cache-enabled component and a corresponding location identifier which identifies a location in the computer network at which the cache-enabled component resides, wherein the placing step places a location identifier that contains a list of network addresses specifying at least one server at which the corresponding cache-enabled component resides and the placing step places a tuple that contains a replica flag, the replica flag distinguishing at least between a master replica used for partitioning and another replica;

receiving an access request which identifies a requested component;

determining whether the requested component is cache-enabled; and servicing the access request by sending a corresponding request over a network communication link to a server computer if the requested component is not cache-enabled, and servicing the access request by using the cached location identifier if the requested component is cache-enabled, whereby the method reduces network traffic and server queries by first caching and then later referring to location information instead of gathering that information anew for each request.

2. The method of claim 1, further comprising the computer-implemented step of reinitializing the cache.

3. The method of claim 1, further comprising the computer-implemented steps of detecting access requests that seek to modify a cache-enabled component identifier, and invalidating cache tuples which contain that identifier.

4. The method of claim 1, further comprising the computer-implemented steps of:

comparing a currently requested operation on a component with cached information about a previously requested operation on the component;

reading the cache to obtain information about the location of the component; and revising the cached location information if the comparing step detects a predetermined difference between the previously requested operation and the currently requested operation.

5. The method of claim 1, further comprising the computer-implemented steps of identifying a requested operation to be performed on a master replica, and redirecting the operation to a non-master replica to reduce the load on the master replica.

6. The method of claim 5, wherein the redirecting step includes modifying the cache.

7. The method of claim 1, wherein the placing step places a database-wide component identifier that identifies a database component.

8. The method of claim 1, wherein the receiving step receives an access request in response to a directory service request.

9. A method for caching information in a computer network, comprising the computer-implemented steps of:

placing at least one tuple in a cache, each tuple containing a component identifier which identifies a cache-enabled component and a corresponding location identifier which identifies a location in the computer network at which the cache-enabled component resides, wherein the placing step places a location identifier that contains a replica-wide component identifier specifying a location at which the corresponding cache-enabled component resides and the placing step places a tuple that contains a replica flag, the replica flag distinguishing at least between a master replica used for partitioning and another replica;

receiving an access request which identifies a requested component;

determining whether the requested component is cache-enabled; and servicing the access request by sending a corresponding request over a network communication link to a server computer if the requested component is not cache-enabled, and servicing the access request by using the cached location identifier if the requested component is cache-enabled, whereby the method reduces network traffic and server queries by first caching and then later referring to location information instead of gathering that information anew for each request.

10. The method of claim 9, further comprising the computer-implemented step of reinitializing the cache.

11. The method of claim 9, further comprising the computer-implemented steps of detecting access requests that seek to modify a cache-enabled component identifier, and invalidating cache tuples which contain that identifier.

12. The method of claim 9, further comprising the computer-implemented steps of:

comparing a currently requested operation on a component with cached information about a previously requested operation on the component;

reading the cache to obtain information about the location of the component; and revising the cached location information if the comparing step detects a predetermined difference between the previously requested operation and the currently requested operation.

13. The method of claim 9, further comprising the computer-implemented steps of identifying a requested operation to be performed on a master replica, and redirecting the operation to a non-master replica to reduce the load on the master replica.

14. The method of claim 13, wherein the redirecting step includes modifying the cache.

15. The method of claim 9, wherein the placing step places a database-wide component identifier that identifies a database component.

16. The method of claim 9, wherein the receiving step receives an access request in response to a directory service request.

17. A computer network comprising:

a client computer having a processor, a memory, and a means for receiving a component access request which identifies a requested component;

a tuple cache residing on the client computer, the tuple cache capable of holding at least one tuple, each tuple containing a component identifier which identifies a cache-enabled component and a corresponding location identifier which identifies a location in the network at which the cache-enabled component resides, wherein the tuple contains a replica flag, and the replica flag distinguishes between a master replica used for partitioning and at least one other replica;

means for placing a tuple in the tuple cache;

means for determining whether the requested component is cache-enabled; and means for servicing the access request by sending a corresponding request over a network communication link to a server computer if the requested component is not cache-enabled, and servicing the access request by using the cached location identifier if the requested component is cache-enabled, wherein the server computer and the client computer are separate computers connected by the network communication link, the network further characterized in that the means operate to reduce network traffic and server queries by first caching and then later referring to location information instead of gathering that information anew for each request.

18. The system of claim 17, wherein the server computer and the client computer are separate computers connected by a network link.

19. The system of claim 17, wherein the location identifier contains a list of network addresses specifying at least one server at which the corresponding cache-enabled component resides.

20. The system of claim 17, wherein the replica flag distinguishes between a read-only replica, a read-write replica, and a master replica.

21. The system of claim 17, further comprising means for reinitializing the cache.

22. The system of claim 17, further comprising means for revising the cached location information to encourage conformance with predetermined preferences that certain operations be performed using certain kinds of replicas.

23. The system of claim 17, further comprising means for detecting access requests that seek to modify a cache-enabled component identifier and for invalidating cache tuples which contain that identifier.

24. The system of claim 17, further comprising means for modifying the cache to redirect operations from a master replica to a non-master replica.

25. A computer storage medium having a configuration that represents data and instructions which will cause at least a portion of a computer system to perform method steps for caching tuples, the method steps comprising the steps of claim 1.

26. The storage medium of claim 25, wherein the method steps comprise the steps of claim 2.

27. The storage medium of claim 25, wherein the method steps comprise the steps of claim 3.

28. The storage medium of claim 25, wherein the method steps comprise the steps of claim 4.

29. The storage medium of claim 25, wherein the method steps comprise the steps of claim 5.

30. The storage medium of claim 25, wherein the method steps comprise the steps of claim 6.

31. The storage medium of claim 25, wherein the method steps comprise the steps of claim 7.

32. The storage medium of claim 25, wherein the method steps comprise the steps of claim 8.

33. A computer storage medium having a configuration that represents data and instructions which will cause at least a portion of a computer system to perform method steps for caching tuples, the method steps comprising the steps of claim 9.

34. The storage medium of claim 33, wherein the method steps comprise the steps of claim 10.

35. The storage medium of claim 33, wherein the method steps comprise the steps of claim 11.

36. The storage medium of claim 33, wherein the method steps comprise the steps of claim 12.

37. The storage medium of claim 33, wherein the method steps comprise the steps of claim 13.

38. The storage medium of claim 33, wherein the method steps comprise the steps of claim 14.

39. The storage medium of claim 33, wherein the method steps comprise the steps of claim 15.

40. The storage medium of claim 33, wherein the method steps comprise the steps of claim 16.

* * * * *